United States Patent [19]
Wilson

[11] 3,856,751
[45] Dec. 24, 1974

[54] DIACID-XANTHYLIUM ION POLYESTER AND PHOTOGRAPHIC ELEMENT COMPRISED THEREOF

[75] Inventor: John C. Wilson, Irondequoit, N.Y.

[73] Assignee: Eastman Kodak Company, Rochester, N.Y.

[22] Filed: June 14, 1972

[21] Appl. No.: 262,911

[52] U.S. Cl............ 260/47 C, 96/87 R, 260/33.4 P, 260/33.8 R
[51] Int. Cl............................................ C08g 17/08
[58] Field of Search ................................. 260/47 C

[56] References Cited
UNITED STATES PATENTS

| | | | |
|---|---|---|---|
| 3,517,071 | 6/1970 | Caldwell et al. | 260/619 |
| 3,634,089 | 1/1972 | Hamb | 96/87 |
| 3,657,185 | 4/1972 | Wear | 260/47 C |
| 3,721,649 | 3/1973 | Burguette | 260/47 C |
| 3,725,070 | 4/1973 | Hamb et al. | 96/87 R |

*Primary Examiner*—Lester L. Lee
*Attorney, Agent, or Firm*—A. H. Rosenstein

[57] ABSTRACT

A polymer is disclosed comprised of a repeating unit formed of the ester of a diacid with a xanthylium ion which is oxygen substituted in each of its benzo rings. A second repeating unit can also be present which is an ester of a diacid and an aliphatic or aromatic diol. The polymer exhibits an inherent viscosity of from 0.2 to 1.5 and exhibits a glass transition temperature in excess of 200°C. The polymer is suited to the formation of structural elements and, particularly, supports for photographic elements capable of remaining dimensionally stable at elevated temperatures.

12 Claims, No Drawings

DIACID-XANTHYLIUM ION POLYESTER AND PHOTOGRAPHIC ELEMENT COMPRISED THEREOF

This invention relates to a new class of polyesters suited to the fabrication of structural elements, particularly photographic elements. In a more specific aspect this invention relates to a polyester formed by the condensation of a diacid with a xanthylium ion having appending oxygen substituted benzo rings. In a preferred form this invention is directed to structures, such as photographic elements, incorporating such polyesters and capable of remaining dimensionally stable at elevated temperatures.

Prior to this invention the desirability of forming polyesters and structures comprised thereof capable of remaining dimensionally stable at elevated temperatures has been recognized in the art. A specific goal has been to identify structurally useful polyesters having glass transition temperatures in excess of 200°C. Structures comprised of such polyesters are particularly useful as supports for photographic elements requiring stability at high temperatures.

The preparation of certain monomeric xanthylium compounds has been reported by D. D. Pratt and R. Robinson, J. Chem. Soc., 123, 739–45 (1923). However, no teaching or suggestion of reacting difunctional xanthylium compounds to form polymers and, more specifically, polyesters, prior to this invention is believed to have been known.

In one aspect this invention relates to a linear polyester having an inherent viscosity in the range of from 0.2 to 1.5 having as a repeating unit thereof the ester of a diacid and a xanthylium ion having each of its benzo rings substituted with an appending ester forming oxygen atom. In a preferred application such linear polyesters can be utilized to fabricate structural elements, such as supports for photographic elements. These and other aspects of this invention can be better appreciated by reference to the following detailed disclosure:

The xanthylium ions useful in forming polyesters according to this invention are those xanthylium ions which have ester forming oxygen substituents appending from each benzo ring of the xanthylium ion. In one form such xanthylium ions may be designated by the structural formula:

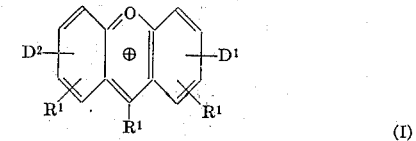

in which $D^1$ is a hydroxyl group and $D^2$ is a hydroxyl group or an anionic oxy substituent and $R^1$ is in each occurrence independently chosen from the group consisting of hydrogen, alkyl (preferably lower alkyl - i.e. having 1–6 carbon atoms), aromatic, halogen, alkoxy and cyano substituents. As utilized herein the term "anionic oxy substituent" or "oxy anion substituent" is intended to designate an appending oxygen substituent to the xanthylium benzo ring which exhibits a net negative electronic charge of one. In a specific preferred embodiment of the invention $D^1$ and $D^2$ occupy ring positions 3 and 6 while $R^1$ occupies ring position 1, 8 and 9.

When $D^1$ and $D^2$ are both hydroxyl groups the xanthylium ion bears a net positive charge of one. Accordingly, an anion is typically associated with the xanthylium ion in its dihydroxy form. This anion for purposes of this invention can take the form of any monovalent anion. Exemplary of suitable monovalent anions are halide anions - i.e. fluoride, chloride, bromide, iodide; hydrogen sulfate; dihydrogen phosphate; hydroxide; acetate; nitrate; etc.

When $D^2$ is an oxy anion exhibiting a net negative charge of one and exhibiting a monovalent appending substitution linkage with the benzo ring with which it is associated, the xanthylium ion is a zwitterion. In this form the net positive charge of one associated with the ring structure of the xanthylium ion is balanced by the net negative charge of the oxy anion and the xanthylium ion does not exhibit an overall net charge. Accordingly, no external ions are necessarily associated with the xanthylium ion in its zwitterion form. When the xanthylium ion is oxy anion substituted, it is isomeric with the ketone of the corresponding xanthene. In the manner of enol-keto tautomers, the xanthylium zwitterions utilized in the practice of this invention and their corresponding ketoxanthenes bear a functionally interchangeable tautomeric relationship. For example, 3-anionic oxy-6-hydroxy substituted xanthylium ions of structural formula I are for the purposes of this invention interchangeable with the corresponding 6-hydroxy-3H-xanthene-3-ones as expressed by the following equation:

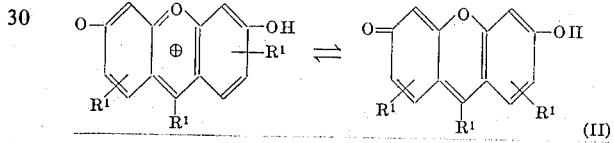

in which $R^1$ is defined as in structural formula I. In view of this interchangeable relationship it is to be recognized that references to oxy anion substituted xanthylium ions in this application are intended to be inclusive of the corresponding keto-xanthenes.

Exemplary of preferred xanthylium ions useful in the practice of this invention are the following: 3,6-dihydroxy-9-phenylxanthylium ion; 6-hydroxy-3-anionic oxy-9-phenylxanthylium ion (6-hydroxy-9-phenyl-3H-xanthene-3-one); 3,6-dihydroxy-9-methylxanthylium ion; 6-hydroxy-3-anionic oxy-9-methylxanthylium ion (6-hydroxy-9-methyl-3H-xanthene-3-one); 3,6-dihydroxy-1,8-dimethylxanthylium ion; 6-hydroxy-3-anionic oxy-1,8-dimethylxanthylium ion (6-hydroxy-1,8-dimethyl-3H-xanthene-3-one); 3,6-dihydroxy-1,8-dimethyl-9-phenylxathylium ion; 6-hydroxy-3-anionic oxy-1,8-dimethyl-9-phenylxanthylium ion (6-hydroxy-1,8-dimethyl-9-phenyl-3H-xanthene-3-one); 1,8-dihydroxy-3,6-di-t-butyl-9-phenylxan-thylium ion; 8-hydroxy-1-anionic oxy-3,6-di-t-butyl-9-phenyl-xanthylium ion (8-hydroxy-3,6-di-t-butyl-9-phenyl-1H-xanthene-1-one); 3,6-dihydroxy-1,8-di-methoxyxanthylium ion; 6-hydroxy-3-anionic oxy-1,8-dimethoxyxanthylium ion (6-hydroxy-1,8-dimethoxy-3H-xanthene-3-one); 3,6-dihydroxy-1,8-diethylxanthylium ion; 6-hydroxy-3-anionic oxy-1,8-diethylxanthylium ion (6-hydroxy-1,8-diethyl-3H-xanthene-3-one); 3,6-dihydroxy-1,8-dipropylxanthylium ion; and 6-hydroxy-3-anionic oxy-1,8-dipropylxanthylium ion (6-hydroxy-1,8-dipropyl-3H-xanthene-3-one).

The benzo ring oxygen substituted xanthylium ions utilized in the practice of this invention are formed into polyesters by condensation polymerization ——i.e. esterification ——with diacids. The prefered diacids for the practice of this invention are set forth in the following structural formulas:

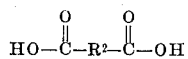
(III)

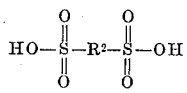
(IV)

in which $R^2$ can be aliphatic or aromatic and is preferably a divalent hydrocarbon radical.

In referring to esters of dibasic acids such as those set forth above it is recognized that it is often advantageous to utilize a derivative of the acid rather than the free acid itself in forming the corresponding ester. For example, useful equivalents of the above free acids include the corresponding acid anhydrides; the lower monohydric alcohol and phenyl esters thereof; the diacid halides, such as the chlorides, bromides, etc,; and the like.

Exemplary of suitable dicarboxylic acids according to structural formula III, which can be employed to advantage in the practice of this invention are succinic acid, glutaric acid, adipic acid, pimelic acid, azelaic acid, sebacic acid, 2-methyladipic acid, diglycolic acid, thiodiglycolic acid, fumaric acid, cyclohexane-1,3-dicarboxylic acid, cyclohexane-1,4-dicarboxylic acid, cyclopentane-1,3-dicarboxylic acid, 2,5-norbornanedicarboxylic acid, phthalic acid, isophthalic acid, terephthalic acid, t-butylisophthalic acid, phenylenediacetic acid, phenylenedipropionic acid, 2,6-naphthalenedicarboxylic acid, 1,4-naphthalenedicarboxylic acid, 1,5-naphthalenedicarboxylic acid, 1,7-naphthalenedicarboxylic acid, 4,4′-diphenic acid, 4,4′-sulfonyldibenzoic acid, 4,4′-stilbenedicarboxylic acid, and 9,10-triptycenedicarboxylic acid. It is specifically contemplated to utilize dicarboxylic acids known to to be useful in forming linear polyesters having high glass transition temperatures, such as, for example, 5-carboxy-3-(carboxyphenyl)indans, as set forth in U.S. Pat. No. 3,634,089, issued Jan. 11, 1972, here incorporated by reference.

Exemplary of suitable acids according to structural formula IV which can be employed to advantage in the practice of this invention are the following: 1,2-ethanedisulfonic acid; 2-methylpropane-1,2-disulfonic acid; 1,3-propanedisulfonic acid; 1,4-butanedisulfonic acid; 1,5-pentanedisulfonic acid; 1,6-hexanedisulfonic acid; 1,8-octanedisulfonic acid; 1,10-decanedisulfonic acid; 1,11-undecanedisulfonic acid; 1,14-tetradecanedisulfonic acid; 1,17-heptadecanedisulfonic acid; 1,20-eicosandisulfonic acid; m-benzenedisulfonic acid; o-benzenedisulfonic acid; napthalene-1,3-disulfonic acid; napthalene-1,4-disulfonic acid; napthalene-1,5-disulfonic acid; napthalene-1,6-disulfonic acid; napthalene-1,7-disulfonic acid; napthalene-1,8-disulfonic acid; napthalene-2,6-disulfonic acid; napthalene-2,7-disulfonic acid; 7,7-dimethyl-7H-dibenzo [c,h]xanthene-5,9-disulfonic acid; and 4,4′-diphenyletherdisulfonic acid. It is preferred to utilize these acids in the form of disulfonyl halides, most preferably disulfonyl chlorides, in forming esters according to this invention.

In one form the polyesters of this invention are entirely made up of repeating units each containing an ester of a xanthylium ion and a dibasic acid, hereinafter designated as first or xanthylium repeating units. The advantages of this invention can also be obtained when aliphatic and/or aromatic diols are esterified with the dibasic acids as set forth in structural formulas III and IV in addition to the xanthylium ions. The resulting polyesters are comprised of first or xanthylium repeating units as above noted and also second repeating units each formed by the esterification of a nonxanthylium diol with a dibasic acid. Exemplary of diols which can be incorporated in such second repeating units of the polyester are bisphenols, monocyclic diols and alkylene glycols.

The bisphenols employed in this invention are generally of the structure of formula V:

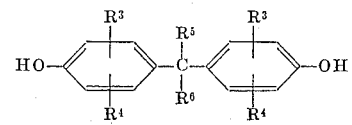
(V)

wherein $R^3$ and $R^4$, which can be the same or different, are selected from the group consisting of hydrogen atoms, aryl radicals, such as phenyl, including substituted phenyl, halogen atoms, nitro radicals, cyano radicals, alkoxy radicals and the like, and wherein the substituents on the phenyl radical may be a halogen atom, nitro radical, cyano radical or alkoxy radical. $R^5$ and $R^6$ represent aliphatic, monocyclic or bicyclic radicals and can each be hydrogen atoms, alkyl radicals of from 1 to 6 carbon atoms, including substituted alkyl radicals, such as fluoromethyl, difluoromethyl, trifluoromethyl, dichlorofluoromethyl, 2-[2,3,4,5-tetrahydro2,2-dimethyl-4-oxofur-3-yl]ethyl and the like; cycloakyl radicals of from 4 to 6 carbon atoms, such as cyclohexyl; and aromatic radicals having from 6 to 20 carbon atoms, such as phenyl, 3,4-dichlorophenyl, 2,4-dichlorophenyl. $R^5$ and $R^6$ taken together with the carbon atom to which they are attached can represent a monocyclic, bicyclic or heterocyclic moiety having from 4 to 7 atoms in the ring.

Typical useful bisphenols include: 2,2-bis(4-hydroxyphenyl)propane [Bisphenol A]; 2,2-bis(4-hydroxy3,5-dichlorophenyl)propane[tetrachlorobisphenol A]; 1-phenyl-1,1-bis(4-hydroxyphenyl)ethane; 1-(3,4-dichlorophenyl)1,1-bis(4-hydroxyphenyl)ethane; 2,2-bis(4-hydroxyphenyl)-4-[3-(2,3,4,5-tetrahydro-2,2-dimethyl-4-oxofuryl)]butane; bis(4-hydroxyphenyl)methane; 2,4-dichlorophenylbis(4hydroxyphenyl)methane;1,1-bis(4-hydroxyphenyl)cyclohexane; 1,1,1,3,3,3-hexafluoro-2,2-bis(4-hydroxyphenyl)propane; diphenylbis(4-hydroxyphenyl)methane, 1,4-naphthalenediol, 2,5-naphthalenediol bis(4-hydroxy-2-methyl-3-propylphenyl)methane, 1,1-bis(2-ethyl-4-hydroxy-5-sec.-butylphenyl)ethane, 2,2-bis(4-hydroxy-2-methyl-5-tert.-butylphenyl)propane, 1,1-bis(4-hydroxy-2-methyl-5-isooctylphenyl)isobutane, bis-(2-ethyl-4-hydroxyphenyl)-4,4-di-p-tolylmethane. Still other useful bisphenols are disclosed in U.S. Pat. No. 3,030,335 and Canadian Pat. No. 576,491.

Typical monocyclic diols include hydroquinone and hydroquinones substituted with alkyl groups of 1 to 15 carbon atoms, or halogen atoms, resorcinol, unsubstituted or substituted with lower alkyl groups or halogen atoms, and the like, 1,4-cyclohexanediol, 1,4-cyclohexanedimethanol, 1,4-cyclohexanediethanol, 1,-4-bis(2-hydroxyethoxy)cyclohexane, 1,4-benzenedimethanol, 1,4-benzenediethanol and the like.

Illustrative examples of polyalicyclic diols include norbornylene glycol, decahydro-2,6-naphthalenedimethanol and the compounds listed in Table 1 of U.S. Pat. No. 3,317,466 under the heading of "Bisphenols."

Exemplary alkylene glycols include ethylene glycol, diethylene glycol, triethylene glycol, 1,2-propanediol, 1,3-propanediol, 1,4-butanediol, 2,3-butanediol, 1,5-pentanediol, 1,6-hexanediol, 1,7-heptanediol, 1,8-octanediol, 1,9-nonanediol, 1,10decanediol, 1,12-dodecanediol, neopentyl glycol, 2,2,4-trimethyl-1,6-hexanediol, and 4-oxa-2,6-heptanediol.

Generally, any esterification procedure known in the art for making linear polyesters is useful for preparing those of this invention. Typical representative techniques for forming polyesters include interfacial, solution and ester interchange procedures, such as are set forth in U.S. Pat. No. 3,634,089, issued Jan. 11, 1972. The xanthylium ions utilized in forming these esters, can, of course, be prepared by the procedures set forth by Pratt and Robinson, noted above.

Polyesters of benzo ring substituted xanthylium ions and dibasic acids having inherent viscosities in the range of from 0.2 to 1.5 are recognized to exhibit useful structural properties permitting their utilization in fibers, lacquers, adhesives, molded articles and sheet and film stock generally. For utilization as flexible film stock such as that utilized as a support in photographic element it is preferred that the polyesters of this invention exhibit inherent viscosities in the range of from 0.5 to 0.7. The inherent viscosities indicated throughout this application are those measured at 25°C in an equal parts by weight mixture of phenol and chlorobenzene at a concentration of 0.10 grams of polyester per 100 ml of solution.

Such structurally useful polyesters according to this invention have been found to be particularly useful for those applications requiring dimensional stability of structural articles at elevated temperatures. As a measure of such stability at elevated temperatures it is noted that polyesters according to this invention containing at least five percent on a monomeric mole basis of xanthylium repeating units as above defined exhibit glass transition temperatures in excess of 200°C. Further, when, as is preferred, the polyesters of this invention are comprised of at least 10 percent on a monomeric mole basis of such xanthylium repeating units, they exhibit glass transition temperatures in excess of 350°C and, typically, above 400°C. The glass transition temperatures of the polymers of this invention are those determined by differential scanning calorimetry as disclosed in "The DSC Cell and Accessories Instruction Manual for the 900 Thermal Analyzer and Modules" available from E. I. duPont de Nemours Instrument Products Division, at a heating rate of 10°C per minute in a nitrogen atmosphere.

The preferred applications for the polyesters of this invention are in forming flexible supports for photographic elements. The polyesters are readily cast into flexible supports by techniques well known to those skilled in the art. Generally the flexible supports are treated to improve the adhesion of superimposed coatings or layers, such as by providing conventional subbing agents for polyester supports, contacting with a chemical agent such as sulfuric acid, electron bombardment, and the like. One or more conventional photographically active radiation-sensitive coatings, such as silver halide emulsion coatings, are then deposited onto the support. The thermally stable supports are particularly useful in forming photographic elements intended to be heat processed or heat stabilized. In particular, one preferred embodiment relates to photographic elements comprising supports formed of polyesters according to this invention having thereon at least one layer of a photographic emulsion which contains silver halide grains having polyvalent ions included therein as disclosed in Bacon et al U.S. Pat. No. 3,447,927. Photographic elements of this type can be processed according to Colt, U.S. Pat. No. 3,418,122, issued Dec. 24, 1968.

This invention may be better appreciated by reference to the following illustrative specific embodiments:

EXAMPLES 1-6

Preparation and Properties of Polyesters Formed of Xanthylium Repeating Units

To a mixture of 2.76 g (0.01 mole) of 3,6-dihydroxy-1,8-dimethylxanthylium chloride, 44 ml (0.022 mole) of 0.5 N sodium hydroxide, 56 ml of distilled water and 2 drops of tri-n-butylamine in a Waring blender was added a solution of 2.39 g (0.01 mole) of sebacyl chloride in 50 ml of methylene chloride. After 2 minutes of reaction, the mixture set up. An additional 50 ml of methylene chloride was added and the mixture was stirred for another 5 minutes. The polymer was then precipitated in 1500 ml of methanol, collected and dried.

Using the above dihydroxy xanthylium compound, the corresponding oxy anion xanthylium compound and various dicarboxyl chlorides as generally indicated by reference to reactants VI, other polyesters were formed using the preparation procedure set forth above. In initially heating the polyesters to their glass transition temperatures ($T_g$) certain heat liberation and absorption properties were noted that were not observed during the second and subsequent heatings. Accordingly the glass transition temperatures set forth are those obtained during the second heating of the polyester in each instance. The specific dicarboxyl chlorides, the xanthylium ions and their properties are set forth in Table I.

Polyesters having similar useful properties can also be obtained using xanthylium compounds as set forth in structural formula I and diacids as set forth in structural formulas III and IV.

TABLE II

Properties of Copolyesters Formed of Xanthylium and Bisphenol A Repeating Ester Units

| Example No. | $D^2$ | Xanthylium Repeating Units — Mole percent | Inherent Viscosity | Tg (°C) (First heating)* |
|---|---|---|---|---|
| 7 | —OH | 10 | 0.57 | >400 |
| 8 | —OH | 20 | 0.48 | 236 |
| | | | 0.30 | >370 |
| 9 | —OH | 30 | (insolubles) | >370 |
| 10 | $O^\ominus$ | 10 | 0.50 | >400 |
| 11 | $O^\ominus$ | 20 | 0.40 | >400 |

*No second heating was considered necessary, since no heat liberation or absorption by the polyesters was detected, except in Example 8, which on second heating exhibited a Tg of 227°C.

TABLE I.—PROPERTIES OF POLYESTERS FORMED OF XANTHYLIUM REPEATING UNITS $$D^2 \text{-(xanthylium with } CH_3, CH_3\text{)-OH} + Cl-\overset{O}{\underset{\|}{C}}-R^2-\overset{O}{\underset{\|}{C}}-Cl \quad VI$$

| Ex. No. | $D^2$ | $R^2$ | Inherent viscosity | Tg (°C) (second heating) |
|---|---|---|---|---|
| 1 | —OH | —(CH$_2$)$_8$— | 0.64 | >400 |
| 2 | $O^\ominus$ | phenyl | 0.32 | >400 |
| 3 | —OH | Same as above | 1.13 | >380 |
| 4 | $O^\ominus$ | phenyl | 0.27 | >400 |
| 5 | —OH | Same as above | 0.27 | >400 |
| 6 | —OH | bisphenol-A type | 0.27 | (¹) |

¹ Not evaluated.

EXAMPLES 7-9

Preparations and Properties of Copolyesters of Dihydroxy Xanthylium and Bisphenol A Repeating Ester Units A mixture of 0.553 g (0.002 mole) of 3,6-dihydroxy-1,8-dimethylxanthylium chloride, 4.110 g (0.018 mole) of 4,4'-isopropylidenediphenol, 88 ml (0.044 mole) of 0.5 N sodium hydroxide, 62 ml of distilled water and 3 drops of tri-n-butylamine was prepared in a Waring blender. To the mixture was added a solution of 2.03 g (0.01 mole) of terephthaloyl chloride and 2.03 g (0.01 mole of isophthaloyl chloride in 50 ml of methylene chloride. The resulting mixture was then stirred for 10 minutes. Glacial acetic acid (10 ml) was added and the polymer was precipitated in 1500 ml of methanol. The polymer was then collected and dried.

The above procedure was then repeated increasing the mole percent of xanthylium ester repeating units from 10 percent to 20 percent and then to 30 percent. The properties of each resulting copolyester is set forth in Table II.

EXAMPLES 10 and 11

Preparations and Properties of Copolyesters of Oxy Anion Xanthylium and Bisphenol A Repeating Units In a Waring blender was placed 0.48 g (0.002 mole) of 6-hydroxy-1,8-dimethyl-3H-xanthene-3-one, 1.83 g (0.008 mole) of 4,4'-isopropylidenediphenol, 44 ml (0.022 mole) of 0.5 N sodium hydroxide, 56 ml of distilled water and 2 drops of tri-n-butylamine. To this mixture was added a solution of 1.015 g (0.005 mole) of terephthaloyl chloride, 1.015 g (0.005 mole) of isophthaloyl chloride and 50 ml of methylene chloride. Stirring was maintained for 5 minutes. (After 2 minutes, the polymer set up, requiring the addition of 50 ml of additional methylene chloride). The basic mixture was scraped into 1500 ml of methanol and the polymer was isolated and dried.

The above procedure was then repeated increasing the mold percent of xanthylium ester repeating units from 10 percent to 20 percent. The properties of each resulting copolyester is set forth in Table II.

Similarly useful copolyesters can also be obtained by utilizing glycols and other aromatic diols, such as those set forth in structural formula V.

EXAMPLE 12

Preparation and Properties of Polyester Formed of Disulfonic Acid Containing Xanthylium Repeating Units In a Waring blender was placed 1.38 g (0.005 mole) of 3,6-dihydroxy-1,8-dimethylxanthylium chloride, 22 ml (0.011 mole) of 0.5 N sodium hydroxide, 28 ml of distilled water and 1 drop of tri-n-butylamine. To this mixture was added a solution of 2.53 g (0.005 mole) of 7,7-dimethyl-7H-dibenzo-[c,h]xanthene-5,9-disulfonyl chloride in 100 ml of chloroform. This mixture was stirred for 1.75 hrs., adding 50 ml additional chloroform after 1 hour of reaction. Glacial acetic acid (10 ml) was then added and the mixture was poured into 1500 ml of methanol. The precipitated polymer was collected and dried. The inherent viscosity was noted to be 0.15, but by using techniques well known to the art, such as changing the choice of solvents, acid acceptors, reaction temperature or reactant purities, for example, the inherent viscosity could have been increased to above 0.20.

EXAMPLE 13

Preparation of Polyester Film by Solvent-casting

A sample of 5.0 grams of polyester from Example 7 was dissolved in chloroform, filtered and concentrated to approximately 25 ml. This solution was then coated on a polytetrafluoroethylene coated glass plate and allowed to dry at 25°C to 55°C. An orange, amorphous self-supporting film was thus formed.

EXAMPLE 14

Preparation of Photographic Element

A strip of film from Example 13 was treated according to the process of Belgium Pat. No. 736,993, issued Oct. 15, 1969. The strip was then coated with a gelatin silver halide emulsion. In adhering cellophane tape to the emulsion coating and tearing it away the emulsion was noted to retain its adhesion to the strip. This indicated that the emulsion adhered satisfactorily to the strip. The high glass transition temperatures of the polyester used in forming the strip indicated its suitability for use at elevated temperatures.

Similarly useful films can, of course, be fabricated in like manner from each of the various polyesters and copolyesters set forth in the preceeding examples.

The invention has been described in detail with particular reference to preferred embodiments thereof, but it will be understood that variations and modifications can be effected within the spirit and scope of the invention.

I claim:

1. A linear polyester having an inherent viscosity in the range of from 0.2 to 1.5 and having as a repeating unit thereof the ester of (1) an organic diacid or ester forming derivative thereof and (2) a xanthylium ion having a formula selected from the group consisting of:

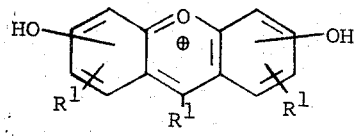

and

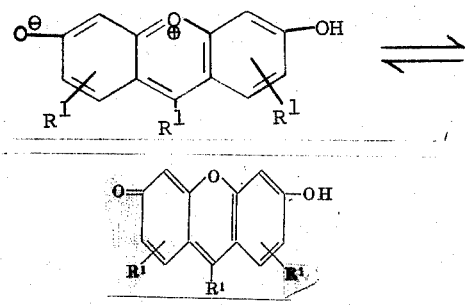

in which $R^1$ is in each occurrence independently chosen from the group consisting of hydrogen, alkyl, aromatic, halogen, alkoxy and cyano substituents; where the inherent viscosity is measured at 25°C using a solution containing 0.10 grams of said polyester per 100 ml. of solution in which the solvent is a mixture of phenol and chlorobenzene in equal parts by weight.

2. A linear polyester according to claim 1 in which said inherent viscosity is in the range of from 0.5 to 0.7.

3. A linear polyester according to claim 1 having a glass transition temperature in excess of 200°C.

4. A linear polyester according to claim 1 in which said ester of said diacid and said xanthylium ion comprise at least five percent on a monomeric mole basis of said polyester.

5. A linear polyester having an inherent viscosity in the range of from 0.2 to 1.5 having as a repeating unit thereof the ester of
a xanthylium ion having the structural formula:

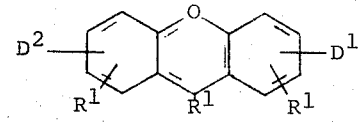

in which $D^1$ is a hydroxyl group and $D^2$ is a hydroxyl group or an oxy anion substituent and $R^1$ is in each occurrence independently chosen from the group consisting of hydrogen, alkyl, aromatic, halogen, alkoxy and cyano substituents, and
a dibasic acid, or ester forming derivative thereof, chosen from the group consisting of

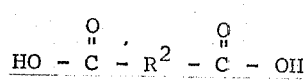

and, $HO_3S - R^2 - SO_3H$ in which $R^2$ may be aliphatic or aromatic, where the inherent viscosity is measured at 25°C. using a solution containing 0.10 grams of said polyester per 100 ml of solution in which the solvent is a mixture of phenol and chlorobenzene in equal parts by weight.

6. A linear polyester according to claim 5 in which $D^1$ and $D^2$ occupy ring positions 3 and 6 and $R^1$ occupies ring positions 1, 8 and 9.

7. A linear polyester according to claim 6 in which $R^1$ is methyl in ring positions 1 and 8 and hydrogen in ring position 9.

8. A linear polyester according to claim 5 in which said dibasic acid is chosen from the group consisting of terephthalic acid, isophthalic acid and mixtures thereof.

9. A linear polyester according to claim 5 in which said linear polyester is comprised of said ester of said dibasic acid and said xanthylium ion as a first repeating unit and as a second repeating unit an ester of a dibasic aliphatic or aromatic acid and an aliphatic or aromatic diol, said first repeating unit accounting for at least one percent on a monomeric mole basis of said linear polyester.

10. A linear polyester according to claim 9 in which said first repeating unit accounts for 10 percent on a monomeric mole basis of said linear polyester.

11. A linear polyester according to claim 9 in which said diol is a bisphenol.

12. A linear polyester according to claim 9 in which said dibasic acid of said second repeating unit is isophthalic acid, terephthalic acid, or a mixture thereof.

* * * * *

UNITED STATES PATENT OFFICE
CERTIFICATE OF CORRECTION

PATENT NO. : 3,856,751

DATED : December 24, 1974

INVENTOR(S) : John C. Wilson

It is certified that error appears in the above-identified patent and that said Letters Patent are hereby corrected as shown below:

Column 4, line 39, that part of the formula reading "tetrahydro2,2" should read --tetrahydro-2,2--.

Column 4, line 40, "cycloakyl" should read --cycloalkyl--.

Column 4, line 49, that part of formula reading --hydroxy3,5" should read --hydroxy-3,5--.

Column 4, line 52, that part of formula reading "dichlorophenyl)1,1" should read --dichlorophenyl)-1,1--.

Column 4, line 56, that part of formula reading "(4hydroxyphenyl)" should read --(4-hydroxyphenyl)--.

Column 4, line 60, after "2,5-naphthalenediol", --,-- should be inserted.

Column 5, line 22, "1,10decanediol" should read --1,10-decanediol--.

Column 7, line 33, the structure set forth as:

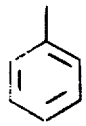     should read     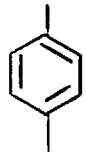

UNITED STATES PATENT OFFICE
CERTIFICATE OF CORRECTION

PATENT NO. : 3,856,751
DATED : December 24, 1974
INVENTOR(S) : John C. Wilson

It is certified that error appears in the above-identified patent and that said Letters Patent are hereby corrected as shown below:

Column 7, line 60, after "mole", --)-- should be inserted.

In the Claims:

(10) Column 10, line 12, that part of formula set forth as:

     should read     

Signed and Sealed this twenty-second Day of July 1975

[SEAL]

Attest:

RUTH C. MASON
Attesting Officer

C. MARSHALL DANN
Commissioner of Patents and Trademarks